Nov. 17, 1925.

A. N. MILLER 1,561,477

OSCILLATORY SAW MACHINE AND GUARD THEREFOR

Filed Feb. 9, 1925     2 Sheets-Sheet 1

INVENTOR.
Adolph N. Miller
BY
Erwin, Wheeler Woland
ATTORNEYS

Nov. 17, 1925.
A. N. MILLER
1,561,477
OSCILLATORY SAW MACHINE AND GUARD THEREFOR
Filed Feb. 9, 1925        2 Sheets-Sheet 2
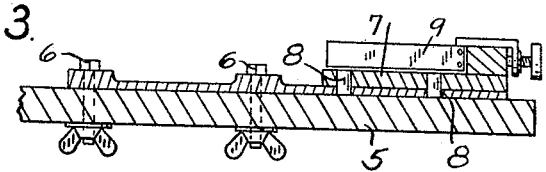
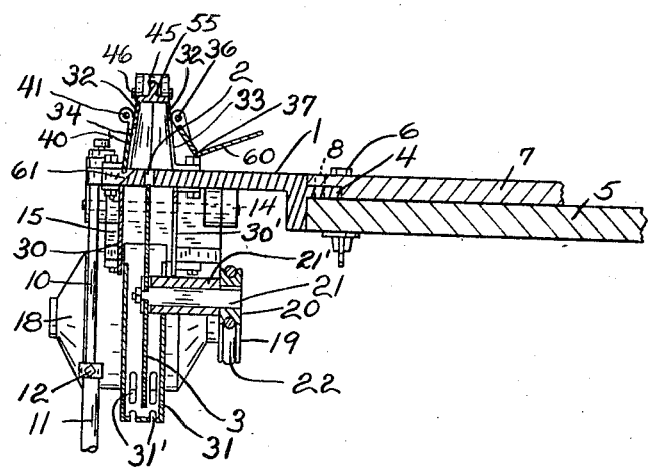
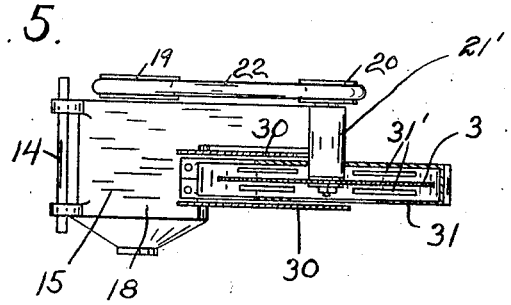
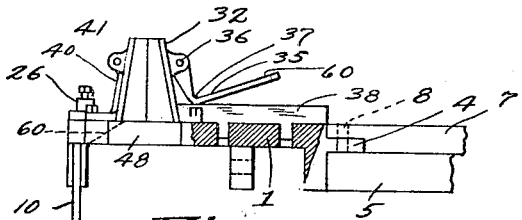
INVENTOR.
Adolph N. Miller
BY Erwin, Wheeler & Harland
ATTORNEYS.

Patented Nov. 17, 1925.

1,561,477

UNITED STATES PATENT OFFICE.

ADOLPH N. MILLER, OF MILWAUKEE, WISCONSIN, ASSIGNOR TO A. N. MILLER COMPANY, OF MILWAUKEE, WISCONSIN, A CORPORATION OF WISCONSIN.

OSCILLATORY-SAW MACHINE AND GUARD THEREFOR.

Application filed February 9, 1925. Serial No. 7,816.

*To all whom it may concern:*

Be it known that I, ADOLPH N. MILLER, a citizen of the United States, residing at Milwaukee, county of Milwaukee, and State of Wisconsin, have invented new and useful Improvements in Oscillatory-Saw Machines and Guards Therefor, of which the following is a specification.

This invention relates to improvements in oscillatory saw machines and guards therefor.

An object of this invention is to provide for a rotary saw movable about a fulcrum and through a slotted work supporting bed plate, a guard completely enclosing the saw in either of its positions above or below the table and having automatically operable doors adapted to admit work upon one side of the guard above the table and to permit such work to pass out upon the other side thereof.

Another object of this invention is to provide for a saw movable about a fulcrum and through a slotted work supporting bed plate, a guard upon the upper side of the plate and including a portion comprising a lever for manually oscillating the saws about its fulcrum.

Still another object of the invention is to provide for a rotary saw and its motor, a unitary mounting upon a lever fulcrumed beneath a work supporting bed plate and having means for manually moving the lever about its fulcrum.

A further object is to provide in oscillatory saw machines, a work supporting bed plate adapted upon one side for attachment at the extreme end of a work table and extending laterally therefrom, and an adjustable support upon the other side of the bed plate and contacting with the floor.

It is a still further object to provide for a saw machine having a work supporting bed plate adapted for attachment at the extreme end of a work table, a gage base and gage member removably attachable to said plate and adapted to rest upon said table.

More specifically it is my object to provide a unitary saw machine comprising a slotted base plate having means for detachably attaching one side thereof to the extreme end of a table and for supporting the other side from the floor, a rotary saw movable through said slot and a motor therefor unitarily mounted upon a bell-crank lever fulcrumed beneath the plate and having an arm extending thereabove, a telescopic guard for the saw disposed below the plate, a guard above the plate for receiving the saw and having a portion comprising a manually operable lever engaged with the bell-crank arm above the base plate, guard doors on the upper guard, one automatically operable to admit work to the exterior of the guard and the other automatically operable to permit the work to pass outwardly of the guard, and a gage plate and gage detachably secured to the base plate and adapted to rest upon the table.

In the drawings:

Fig. 3 is a section taken on line 3—3 of Fig. 1.

Fig. 4 is a section taken on line 4—4 of Fig. 1.

Fig. 5 is a section taken on line 5—5 of Fig. 2.

Fig. 6 is a front elevation partly in section showing the work supporting base with a guard mounted thereon.

Like parts are identified by the same reference characters throughout the several views.

Figure 1:
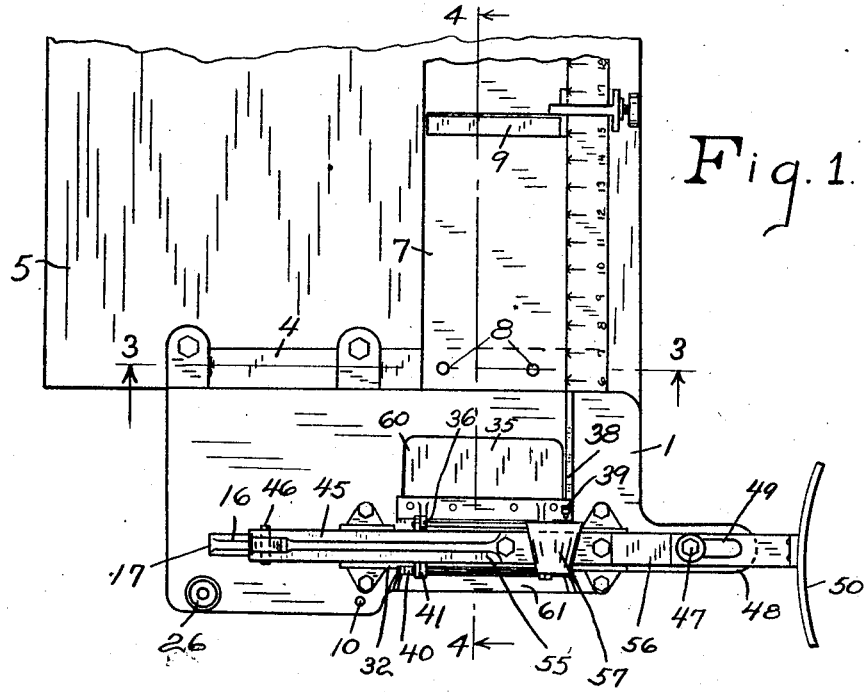
Fig. 1 is a plan view of the saw machine and gage as they appear when attached to a table.
Figure 2:
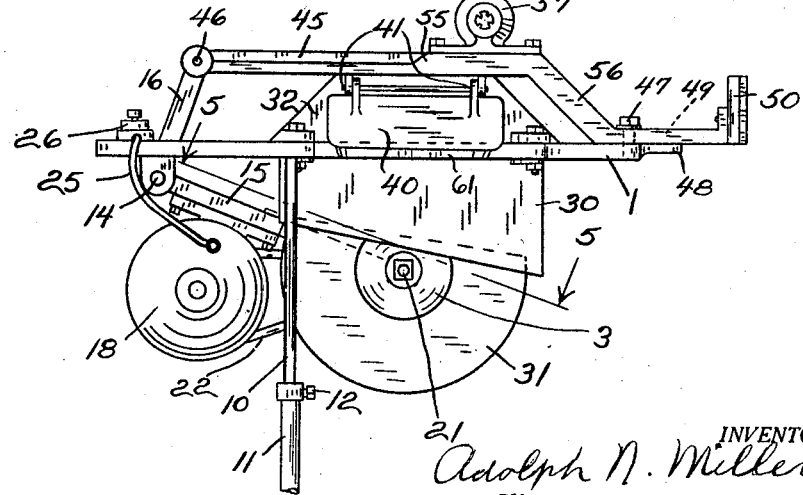
Fig. 2 is a side elevation of the saw machine.

The work supporting base or plate 1 is slotted at 2 to permit the rotary member or saw 3 to move upwardly therethrough and is provided with a horizontally extending portion or clamping shoulder 4 resting upon the table top 5 and having bolts 6 passed through the table for clamping the shoulder 4 thereto. Detachably secured to the shoulder 4 is a gage plate 7 adapted to rest upon the table 5 and having pins 8 receivable in corresponding apertures in the shoulder. The upper surface of plate 7 coincides with the plane of the upper surface of the base 1 and is provided with graduations and gage 9 movable longitudinally thereof. For supporting the outer side of the base 1 a telescopic leg is provided comprising a portion 10 secured to the base, a portion 11 adapted to contact with the floor and a set screw 12 for securing the telescopic members together.

Fulcrumed at 14 beneath the base 1 is a bell-crank lever having an arm 15 below and an arm 16 above the base, the arm 16 being extended through an aperture 17 in such base. Rotatably mounted on the free end of the arm 15 is a rotary member or saw 3, and mounted upon an intermediate portion of the arm is a motor 18. Passing about the pulley 19 on the motor shaft and pulley 20 on the rotary member or saw shaft 21 is a belt 22 for rotating such saw. Wires leading to the motor may be extended as shown at 25 and secured to the base in any desired manner such as illustrated at 26.

Below the base 1 is a guard for the saw comprising a portion 30 fixed to the base and an arcuate portion 31 carried by the bell-crank arm 15 and receivable within the portion 30. The portion 31 is provided with apertures 31' which permit sawdust or the like to pass out of such portion. The portion 30 is slotted on one side at 30' to allow the bearing 35 for the saw shaft 21 to move vertically. Above the base and surrounding the slot 2, is secured a second guard 32 open at the top and front and having its sides apertured at 33 and 34. Guarding the aperture 33 is a V-shaped or synclinal door 35 hinged at 36 to the guard 32. This door may be held in the position shown in Fig. 4 by contact of the lower edge 37 with the upright guard 38, or a set screw 39 may be provided for contact with the walls of the guard to adjust the angular setting of the door 35. To guard the aperture 34 an outwardly swinging door 40 is provided hinged to the guard at 41.

For operating the bell-crank lever, an operating lever 45 is provided pivotally secured to the arm 16 at 46 and slidably secured to the base by means of a bolt 47 engaged with the base tongue 48 and passing through elongated slot 49 in lever 45. An arcuate end 50 is provided on lever 45 with which the body of an operator may contact to move saw 3 through slot 2. The horizontal portion 55 of lever 45 is adapted to close the top of the guard 32 and the forwardly inclined portion 56 is adapted to close the forward end of the guard when the lever 45 is operated. Mounted on the lever 45 is a circular trimmer 57 for trimming the ends of handles, broom sticks, etc.

The device disclosed herein is admirably adapted for sawing successively given lengths of material such as broom sticks. The material to be sawed is inserted into the guard through aperture 33 by passing such material beneath the door 35. The end of the material inserted will contact with the inclined portion 60 of the door and cause such door to move vertically out of the path of the material. A portion of the material may project through the aperture 34 and when sawed off will be caused to drop by reason of the weight of the door 40 and the sloping end 61 adjacent the aperture 34. Proper lengths of material to be sawed off may be determined by moving the gage 9 to the desired graduation on the gage plate and resting one end of the material against such gage.

When the material is in position to be sawed, the operator will force the lever 45 rearwardly by placing his body in contact with the member 50. Movement of such lever rearwardly will close the front of the guard 32 and, through arm 16, move the bell-crank arm 15 upwardly thus passing a portion of the saw through slot 2 and within the guard.

While this invention has been described with reference to rotary saws, it is obvious that the guard arrangement, the unitary tool and power mounting and mechanism for rendering the tool operative may be adapted for other tools than rotary saws. I therefore do not wish to limit this invention to devices having vertically movable rotary saws.

I claim:

1. In a device of the character described, the combination with a work supporting base, of an operating tool adapted to extend above said base, a guard having an apertured side laterally of said tool, said guard enclosing that portion of the operating tool above said base, and a door for closing said aperture, said door being hinged adjacent the upper margin of said aperture, whereby to be opened automatically by material caused to enter said guard.

2. In a device of the character described, the combination with a work supporting base, of an operating tool adapted to extend above said base, a guard having an apertured side laterally of said tool, said guard enclosing that portion of said tool above said base, and a door for closing said aperture, said door being hinged to the outer side of said guard above the upper margin of said aperture and comprising a V-shaped or synclinal element.

3. In a device of the character described, the combination with a slotted work supporting base plate, of a rotary member fulcrumed upon one side of said plate for movement through said slot, a guard upon the other side of said plate adapted for enclosing the rotary member when moved through said slot, and a door on said guard disposed wholly laterally of said rotary member and adapted to be opened automatically by material when such material is passed into said guard.

4. In a device of the character described, the combination with a slotted work supporting base plate, of a rotary member fulcrumed upon one side of said plate for movement through said slot, a guard upon the other side of said plate adapted for enclosing the rotary member when moved through said slot, said guard being apertured upon one side laterally of said rotary member to admit material to be operated upon by said rotary member, and a door for closing said aperture and hinged adjacent the upper side of said aperture whereby to be opened automatically by material caused to enter said guard.

5. In a device of the character described, the combination with a slotted work supporting base plate, of a rotary member fulcrumed upon one side of said plate for movement through said slot, a guard upon the other side of said plate adapted for enclosing the rotary member when moved through said slot, said guard being apertured upon one side laterally of said rotary member to admit material to be operated upon by said rotary member, a door for closing said aperture, said door being hinged to the outer side of said guard adjacent the upper side of said aperture and comprising a V-shaped member, and means for adjusting the angular setting of said door.

6. In a device of the character described, the combination with a slotted work supporting base, of a lever arm having a pivotal connection with said base and disposed therebelow, a rotary member carried by said arm and movable through said slot, a guard above said base for enclosing that portion of said rotary member when moved through said slot and having an aperture in one side laterally of said rotary member, a door for closing said aperture and adapted to be automatically opened by material to be operated upon by said rotary member, a second guard below said base enclosing said rotary member, and means connected with said arm for actuation thereof.

7. In a device of the character described, the combination with a slotted work supporting base, of a lever arm having a pivotal connection with said base and disposed therebelow, a rotary member carried by said arm and movable through said slot, a guard above said base for enclosing that portion of said rotary member when moved through said slot and having an aperture in one side laterally of said rotary member, a door for closing said aperture and adapted to be automatically opened by material to be operated upon by said rotary member, a telescopic guard below said base enclosing said rotary member and comprising a portion secured to said base and a portion secured to said arm, and means connected with said arm for actuation thereof.

8. In a device of the character described, the combination with a slotted work supporting base, of a bell-crank lever pivoted to said base and having one arm above and one arm below said base, a rotary member mounted on the arm below said base and movable through said slot, a guard above said base apertured upon one side laterally of said rotary member and having an open top and a manually operable lever arm pivoted to the bell-crank arm above said base and closing said top, and a door for closing said aperture and adapted to be opened automatically by material to be operated upon by said rotary member.

9. In a device of the character described, the combination with a slotted work supporting base, of a bell-crank lever pivoted to said base and having one arm extending above and one below said base, a rotary member mounted on the arm below said base and movable through said slot, a guard above said base apertured upon one side laterally of said rotary member and having an open front and top, a manually operable lever arm pivoted to the bell-crank arm above said base and closing said top, said lever arm having a portion extending downwardly in front of said guard and adapted to close the front end of said guard when operated, and a door for closing said aperture and adapted to be opened automatically by the advancing work.

10. In a device of the character described, the combination with a slotted base, of a bell-crank lever pivoted to said base and having one arm extending above and one arm below said base, a rotary member mounted on said arm below said base and movable through said slot, a guard above said base apertured upon one side laterally of said rotary member and having an open top, a manually operable lever arm pivoted at one end to the bell-crank arm above said base and secured at the other end to said base for longitudinal movement thereof, said manually operable arm having a portion closing said top, and a door for closing said aperture and adapted to be automatically opened by material inserted through said aperture.

11. In a device of the character described, the combination with a slotted base, of a saw normally below said base and movable through said slot, a telescopic guard for said saw comprising a portion secured below said base, and a second portion movable with said saw and telescopically connected with the first mentioned portion.

12. In a device of the character described, the combination with a slotted base, of a rotary member normally below said base and movable through said slot, a guard enclosing said rotary member below said base, and a second guard above said base enclosing that portion of the saw extended through said slot and having doors automatically operable by the ingress and egress of work to be operated upon by said rotary member, said doors each being disposed wholly laterally of said rotary member.

13. In a device of the character described, the combination with a slotted base, of a rotary member normally below said base and movable through said slot, a telescopic guard for said saw comprising a portion secured below said base and a second portion movable with said saw and telescopically connected with the first mentioned portion, and a second guard above said base enclosing that portion of the saw extended through said slot and having doors automatically operable by the ingress and egress of work to be operated upon by said rotary member, said doors each being disposed wholly laterally of said rotary member.

14. In a device of the character described, the combination with a slotted work supporting base, of a rotary member normally below said base and movable through said slot, a guard above said base adapted to receive that portion of said member projected through said slot and having its opposite sides apertured laterally of said rotary member, a door for closing one of said apertures and adapted to be opened automatically by material to be operated upon by said rotary member when it is brought into contact with said door, and a second door closing the other of said apertures and adapted to be opened automatically by said material when it is projected through said guard, said base having a beveled edge beneath said second door.

15. In a device of the character described, the combination with a work supporting base of an operating tool adapted to extend above said base, a guard having a side apertured laterally of said tool and enclosing that portion of the operating tool above said base, and a door for closing said aperture and adapted to be opened automatically by material to be operated upon by said rotary member when it is inserted through said opening.

16. In a device of the character described, the combination with a work supporting base, of an operating tool adapted to extend above said base, a guard having a side apertured laterally of said tool and enclosing that portion of said tool above said base, and a door for closing said aperture, said door being hinged to the side of the guard adjacent said aperture and having a portion extending angularly upwardly relative to said base, whereby to be opened automatically by material caused to enter said guard.

17. In a device of the character described, the combination with a work supporting base, of an operating tool adapted to extend above said base, a guard having a side apertured laterally of said tool and enclosing that portion of said tool above said base, and a door for closing said aperture, said door being hinged to the outer side of said guard above the upper margin of said aperture and having a portion extending upwardly at an angle relative to said base and laterally of said guard.

ADOLPH N. MILLER.